March 12, 1968
G. J. CROWDES
3,372,467
METHOD AND APPARATUS FOR PLASMA WELDING AND
MAGNETICALLY CORRUGATING METAL TUBING
Filed April 19, 1965
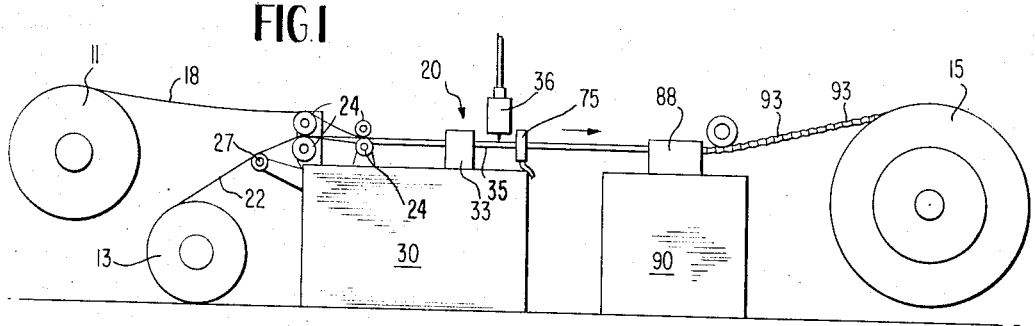
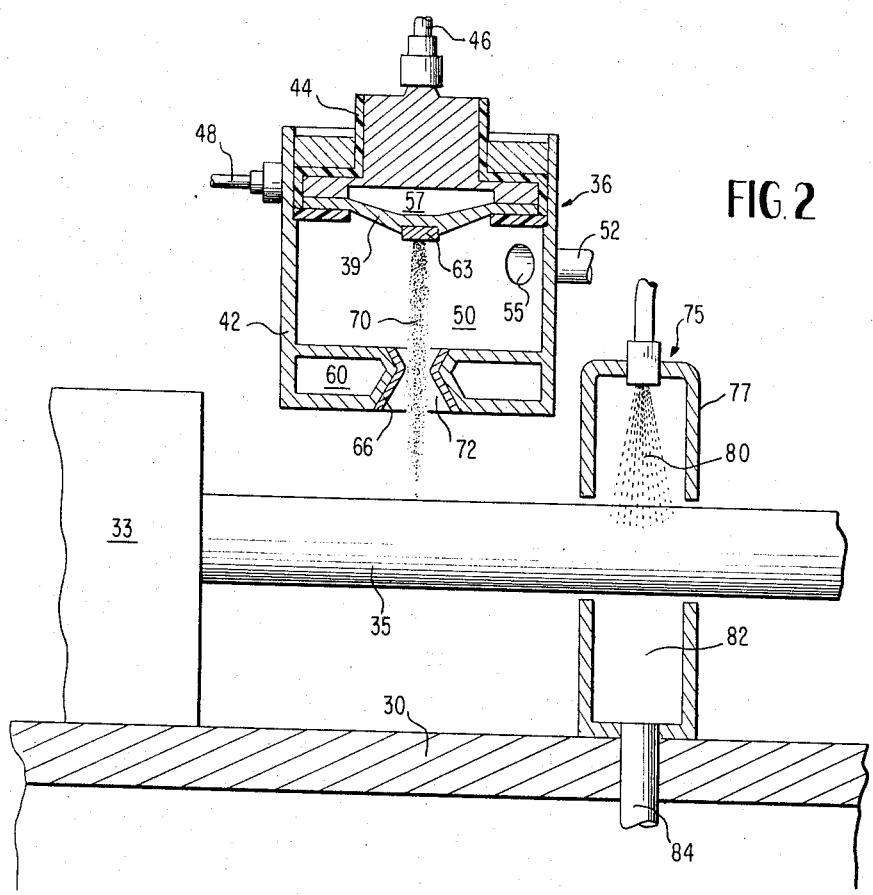
INVENTOR
GEORGE J. CROWDES
BY McLean, Morton & Boustead
ATTORNEYS

United States Patent Office 3,372,467
Patented Mar. 12, 1968

3,372,467
METHOD AND APPARATUS FOR PLASMA WELDING AND MAGNETICALLY CORRUGATING METAL TUBING
George J. Crowdes, West Dennis, Mass., assignor to Simplex Wire and Cable Company, Cambridge, Mass., a corporation of Massachusetts
Filed Apr. 19, 1965, Ser. No. 448,981
4 Claims. (Cl. 29—480)

ABSTRACT OF THE DISCLOSURE

A method for producing shaped tubular metal products from a metal tape is shown. The tape is passed continuously through a tube forming position and a tube swaging position. In the former position, the longitudinal edges of the tape are brought into abutting relationship and a plasma of hot ionized gas is directed at the abutting edges to form a welded seam. The tube then passes through a magnetic swaging position where periodic surges of magnetic flux deform it in a desired configuration. In a preferred embodiment, a tube is first formed and then transversely corrugated.

---

This invention relates to the production of shaped tubing from flat tapes, and in particular, to the production of corrugated tubing made from electrically conductive metal strips in which the strip is rolled into tubular shape, welded and then swaged in one continuous manufacturing line.

The advantage of corrugated tubing, particularly its flexibility, are well-recognized. In particular, tubular corrugated sheathing for electric cable, made of copper, aluminum, steel and other metals and alloys is of widespread use. One recognized technique for such manufacture of such cable is outlined in Lehnert Patent 3,023,300.

In this procedure, electric cable having transversely corrugated tubular metallic sheathing is prepared by bringing strip material of the metal to be employed as a sheath adjacent to an electric conductor assembly which is to form the core of the cable. The strip material and core are then passed simultaneously lengthwise and parallel to each other continuously along a path, in sequence, through a tube-forming position, a tube-gripping position and a tube-corrugating position. In the tube-forming position, the strip material is folded about the cable core axially to form a tubular shape in which the longitudinal edges of the strip material are adjacent to each other and define a lengthwise split in the tube thus formed. Also, in the tube-forming operation the longitudinal split is sealed, for example, by arc welding, to form a longitudinal seam on the tube.

The sealed tube containing the core is then passed through a gripping position in which a "puller" grasps the tube to prevent any rotation of the tube about its axis and simultaneously "pulls" the tube to pass it on to the final corrugating position in which lateral corrugations, which can be either helical or circular, are imparted to the tube to form it into corrugated tubing. The valleys of the corrugations thus formed are usually firmly pressed against the core.

A mechanical corrugating device such as shown in Penrose Patent 2,817,363 is employed in such prior corrugating methods. In the Penrose device the corrugations are imparted helically by rotating several canted rollers about the surface of the tubing, the rollers being radially displaced from the axis of the tubing an appropriate distance to impart the desired depth of corrugations. Prior methods of forming coreless tubing also often follow similar techniques, except that the tube-forming step usually takes place about a stationary core or mandrel.

Such prior mechanical methods for corrugating tubes, including tubular sheathed cable, have a number of inherent disadvantages when the tube-forming and corrugating steps are performed in tandem on a single manufacturing line. For one, the corrugating step generally cannot be performed as quickly as the welding, thereby limiting the manufacturing speed. Also, a serious deterrent is posed to tandem operation because special precautions are required to prevent the torque applied to the sheathed cable in the corrugating step from being transmitted back to the welding stage, which would cause an uneven or otherwise faulty seam.

It is an object of this invention to provide a method and apparatus for producing a longitudinally welded corrugated tube at speeds in excess of any heretofore available in conjunction with forming of the welded tube and corrugating of the tube conducted in tandem on a single manufacturing line.

It is a further object of this invention to provide welded tubes and cable sheaths with thicknesses, as desired, between 10 mils and 150 mils, a range not heretofore available in one manufacturing line.

This invention, although having been developed for forming corrugated tubing is also applicable to the formation of tubes having other shapes, such as tubes having square cross-sections and the like, in which the tube-shapes are imparted by swaging. Consequently, it also is a general object of this invention to provide shaped tubes and cable sheaths.

In accordance with this invention, shaped tubing is formed in a single manufacturing line which includes welding of a tube seam by use of a plasma jet laminar arc and swaging the welded tube by the use of strong magnetic fields. The manufacturing method of this invention preferably also contemplates roll-forming of metal tape into tube, and aligning of edges and holding with carbon blocks before welding, and jet spray cooling before swaging. All of these operations can be synchronized for high speed operation. Such high speed is made possible by the combination of plasma welding of the tube seam and magnetic swaging to shape the tube.

Plasma welding techniques and apparatus, as disclosed, for example, in U.S. Patents 2,919,370; 2,929,952; and 3,136,915 operate by impinging upon the seam to be welded a hot stream of ionized gases which do not react with the metal to be welded. The far greater heat which can be brought to the seam by such techniques enables much faster passage of the cable and sheath or other tubular member through the welding zone than other welding techniques. Further, it has been found that, unlike other welding processes heretofore applied, the distance or separation between the plasma welding arc and the edges to be welded is not very critical, whereas in other welding techniques a variation in the separation between the arc and the seam to be welded in the range of a few mils has been found to cause a critical variation in the quality of the welds. In plasma welding, a variation in the separation between arc and seam of ±⅛ inch or more can usually be tolerated without ill effect.

Plasma arc welding can also be accomplished through a larger range of metal thicknesses. As an example of results obtained, aluminum cable sheaths have been formed and welded at speeds up to 150 feet per minute with thicknesses of 0.025". No previous production line could produce this. Speeds up to 20 feet per minute only have been produced.

Methods and means for generating plasmas of hot ionized gases suitable for welding are known to the art. Such devices generally provide a pair of direct current electrodes suitably positioned in relation to each other so that an electric arc can be struck between them. The apparatus also generally provides for supplying a non-oxidizing gas to the space between the electrodes where the gas can be ionized and for ejecting this ionized gas at a suitable velocity from a nozzle to the workpiece to be welded. The gas employed can be, for example, hydrogen, argon or one of the other group of inert gases, etc. Passage of the gas through the arc serves to ionize the gas to a greater or less extent, so that the resulting plasma jet which emerges from the nozzle comprises a stream of positive ions and electrons diluted by the inert gas. The energy content of such a plasma is, as will be understood, quite high and considerable heat is imparted to the metallic surface to be sealed by the recombination thereon of the positive ions and the free electrons of the plasma. The area around the weld can be protected from oxidation by the use of an extraneous, blanketing, inert or reducing atmosphere, but generally the plasma gas itself served to give enough protection.

Because of the large amounts of heat generated by the laminar plasma arc, it is essential to cool the weld as quickly, and as close to the welding station, as possible. This quick cooling preferably is accomplished with jets of fluid coolant spaced circumferentially around the welded tube to provide for the best weld structure and protection of the core underneath from the heat of the arc. The fluid coolant can be a liquid or a gas, preferably one which does not react with or in other ways deteriously affect the hot seam, for example, water.

In this invention transverse corrugations or other desired shapes are produced by magnetic swaging substantially without application of torque or other unbalanced lateral or axial force to the sheathed cable or other tubular product, thereby eliminating any requirement of a gripping device, such as the "puller" described in Lehnert Patent 3,023,300. At the same time, magnetic swaging permits much greater corrugating and other shaping speeds than heretofore have been considered possible. Thus, a single manufacturing line with tube-forming, including a plasma welder, and magnetic swaging operations in tandem is provided in which shaped tubular products are processed at far greater speeds than heretofore possible, as not only can such high speed forming and swaging methods be used in tandem, but the need of cumbersome and slow-operating tube-gripping devices is obviated.

In magnetic swaging, an electrically conductive material is deformed by electromagnetic means. It is known that when an electric conductor is held in a rapidly changing magnetic field, eddy currents are induced in the conductor which generate forces tending to move the conductor. If the conductor is prevented from movement in the direction of the magnetically generated forces, the forces, of course, tend to deform the conductor. By shaping the magnetic field such that its intensity varies along or about the conductor, the conductor can be shaped in accordance with the intensity variation. This phenomenon is employed for swaging tubing in the method described in copending Crowdes application Ser. No. 448,987, filed of even date herewith, and incorporated herein by reference. In accordance with such method a metal tube to be swaged is drawn through a coil while making major variations in the current passing through the coil. Thus, as the tube is drawn through the coil, a rapid pulse of high current is passed through the coil to create magnetic flux which forms a circumferential groove about the tube. The electric current in the coil is discontinued, allowing the next portion of the tube to pass through as a land and then a pulse of current is once more passed through the coil to form another groove about a succeeding portion of the tube. It is possible, by the use of a magnetically permeable core associated with the coil through which core the tube passes, to form a plurality of lands and grooves simultaneously on the tube, if the core is shaped to provide alternating maxima and minima in flux density along the path through which the tube is drawn. Consequently, a series of corrugations can be formed with each current pulse in the coil, thus, in some cases, allowing an even greater speed through the coil. Other permeable core shapes can be used to provide other shapes to the tube. If desired, the magnetic swaging can be used simply to swage the tube inwardly about a core.

The current pulses through the coil can be obtained by rapid condenser discharge, and to provide for rapidity in the pulses consistent with condenser charge rates, a plurality of condensers can be operably associated with the coil, so that they can be discharged in sequence to give a succession of pulses through the coil more rapidly than might otherwise be obtained. The rapidity of the condenser discharge and the consequent rapidity of the magnetic impulse, it has been discovered, can serve to overcome the effect of movement of the tube or cable sheath through the magnetic field. Electric circuitry is also provided so that one or more of the condensers, usually arranged in parallel, will be charging while another is discharging.

The invention will be better understood from a consideration of the accompanying drawing which should be considered illustrative only and not limiting. In the drawing:

FIGURE 1 is a schematic representation of an assembly line in accordance with this invention for forming transversely corrugated metal sheathing about an insulated conductor, and FIGURE 2 is an enlarged view, partly in cross-section of a plasma welding and quenching station in the assembly line.

In the drawings, cable core payoff reel 11 and tape payoff reel 13 are synchronized with the sheathed cable takeup reel 15 which is driven to pull core 18 and tape 22 through a tube-forming operation and tube-corrugating operation arranged in tandem. Payoff reel 11 feeds cable-core 18 to the tube-forming station indicated generally as 20. Metal tape 22 from the payoff reel 13 is also fed to tube-forming station 20. Station 20 generally includes a series of rolls 24 (only two pairs of which are shown) shaped to produce a longitudinal curvature in the tape 22. Additional support tape rolls 27 can also be provided. These and other elements of the tube-forming station conveniently rest on a support base 30.

The final shaping of the tape to tubular form can be performed by the use of squeeze-blocks 33 which can be, for example, a pair of concave-surfaced carbon blocks, as disclosed in copending Wakefield application Ser. No. 397,216, filed Sept. 17, 1964, incorporated herein by reference. Squeeze-blocks 33 serve to bring the opposite edges of the tape into an abutting relationship, ready for welding. The formed tube, designated 35 in the drawings, is drawn by reel 15 past plasma welding torch 36 to weld the abutting edges of the tube thereby closing the tube and forming a seam. The welded seam of the tube is then drawn past a quenching device 75.

The formed tube is then passed to a magnetic swaging device, indicated generally as 88, which is described in detail in the aforenoted copending Crowdes application. Briefly, swaging device 88 employs an elongated annular coil through which tubing 35 is drawn. In its center the coil is provided with a sleeve-like interior pattern core which is a rigid member, fixedly positioned within the coil and made of a material of high magnetic permeability, such as soft iron, and which is internally corrugated to shape the magnetic flux created by passage of high momentary current through the coil. Direct current pulses are passed through the coil in synchronism with the linear speed of tubing 35 as it passes through the coil at a frequency determined by the time needed for a formed section of corrugated tubing to move out of the coil and be replaced by an unformed section.

Plasma welding torch 36 includes electrodes 39 and 42. Electrode 42 is cup-shaped having an open upper end and a hollow, annular bottom, while electrode 39 is hollow and disk-shaped and is positioned transversely inside the upper end of electrode 42 peripherally separated from the side of electrode 42 by insulation 44. Electrodes 39 and 42 are separately connected by suitable conductors 46 and 48, respectively, to opposite sides of a direct current power supply, not shown. The interior of electrode 42 forms an ionization chamber 50 between electrode 39 and the bottom of electrode 42, and a suitable non-oxidizing gas is supplied to chamber 50 from a duct 52 connected to a hole 55 in the side of electrode 42. Cavities 57 and 60, respectively, in hollow electrode 39 and in the hollow bottom of electrode 42 are utilized for the circulation of fluid coolant to remove heat from the electrodes. The plasma welding torch also is provided with refractory metal surface portions 63 and 66 located on electrode 39 at the point from which the plasma jet issues and on electrode 42 about the opening 72 in its bottom through which the plasma passes. In FIGURE 2 the plasma of hot ionized gas is shown as 70. This plasma, under the impulse of pressure from the duct 52 as well as that stemming from the volume increase caused by heating under the influence of the electric arc, flows out of orifice 72 provided in the electrode 42, and impinges on the tube 35 at the abutting edges of the original tape, to weld such edges together and form a seam.

The following data illustrate typical cases of plasma welding of formed tubes 35. In each case the tube was formed of grade 1060 aluminum about a cable core; argon gas was used in the torch; and the height of orifice 72 above the seam was 0.300 inch.

| Core Diameter, inches | Tube Wall Thickness, inches | Tube Speed, feet/min. | Orifice Diameter, inches | Torch Current, amperes |
|---|---|---|---|---|
| 0.405 | 0.025 | 90 | 0.203 | 210 |
| 0.50 | 0.025 | 80 | 0.203 | 200 |
| 0.75 | 0.037 | 80 | 0.250 | 380 |

Because of the intense heat developed by welding torch 36, a cooling device 75 is generally provided as part of the tube-forming station. This cooling device, in the illustrated case is a hollow ring 77 through which the formed cable 35 is drawn and which is provided with one or more jets 80 for directing a fluid coolant, e.g., water, mineral oil, air, etc., against the newly-welded seam. The fluid can conveniently be drawn off from the chamber 82 by a duct 84.

The formed, welded and cooled tube, as described above, then passes to the magnetic swaging station 88, which can be supported by apparatus 90, where corrugations 93 are imparted to the cable sheath. The corrugated, sheathed cable is then taken up on roll 15.

I claim:

1. A method for the production of shaped tubular metal products which includes continuously passing an indefinite length of metal tape in sequence through a tube-forming position and a magnetic tube-swaging position by drawing finished, shaped tubular product from said tube-swaging position comprising acting on said tape as it passes through said tube-forming position to bring the longitudinal edges of the tape into abutting relationship thereby causing the tape to assume the form of a longitudinally split tube, directing a plasma of hot, ionized, non-oxidizing gas at said split to form a welded seam thereby closing said tube, and acting on said tube as it passes through said swaging position by periodically creating a momentary magnetic flux at said position to swage said tube.

2. A method for the production of transversely corrugated tubular metal products which includes continuously passing an indefinite length of metal tape in sequence through a tube-forming position and a magnetic tube-corrugating position by drawing finished corrugated tubular product from said tube-corrugating position comprising acting on said tape as it passes through said tube-forming position to bring the longitudinal edges of the tape into abutting relationship thereby causing the tape to assume the form of a longitudinally split tube, directing a plasma of hot, ionized, non-oxidizing gas at said split to form a welded seam thereby closing said tube, and acting on said tube as it passes through said corrugating position by periodically creating a momentary magnetic flux at said position shaped to impart a corrugation to said tube whereby said tube passing from said corrugating position is transversely corrugated.

3. An apparatus for the manufacture of shaped tubular metal from an indefinite length of metal tape which includes tube-forming means, magnetic tube-swaging means, and means acting on finished, shaped tubular product to draw said tape through said tube-forming means and said tube-swaging means in sequence, said tube-forming means including means acting on said tape as it passes through said tube-forming means to bring the longitudinal edges of the tape into abutting relationship thereby causing the tape to assume the form of a longitudinally split tube and welding means directing a plasma of hot, ionized, non-oxidizing gas at said split to form a welded seam thereby closing said tube, and said tube-swaging means including magnetic swaging means for periodically creating a momentary magnetic flux shaped and positioned to swage said tube.

4. An apparatus for the manufacture of corrugated tubular metal from an indefinite length of metal tape which includes tube-forming means, magnetic tube-corrugating means, and means acting on finished corrugated tubular product to draw said tape through said tube-forming means and said tube-corrugation means in sequence, said tube-forming means including means acting on said tape as it passes through said tube-forming means to bring the longitudinal edges of the tape into abutting relationship thereby causing the tape to assume the form of a longitudinally split tube and welding means directing a plasma of hot, ionized, non-oxidizing gas at said split to form a welded seam thereby closing said tube, and said tube-corrugating means including magnetic swaging means for periodically creating a momentary magnetic flux shaped and positioned to impart a corrugation to said tube whereby said tube passing through said tube-corrugating means is transversely corrugated.

References Cited
UNITED STATES PATENTS

| | | |
|---|---|---|
| 2,976,907 | 3/1961 | Harvey. |
| 3,023,300 | 2/1962 | Lehnert _____ 219—60 |
| 3,158,727 | 11/1964 | Moelz _____ 219—60 |
| 3,212,311 | 10/1965 | Inoue. |
| 3,286,497 | 11/1966 | Cary. |

JOHN F. CAMPBELL, *Primary Examiner.*

J. L. CLINE, *Assistant Examiner.*